No. 755,284. PATENTED MAR. 22, 1904.
R. M. DIXON.
END TRAIN PIPE VALVE.
APPLICATION FILED OCT. 27, 1902.
NO MODEL.
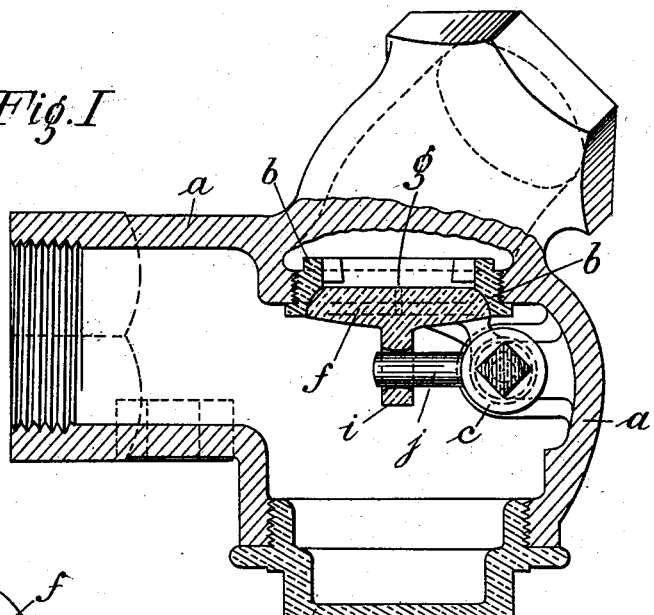
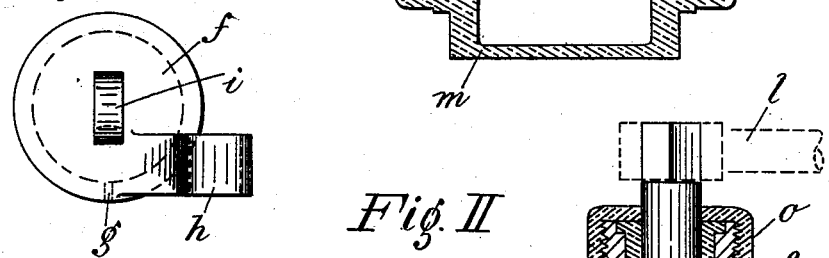
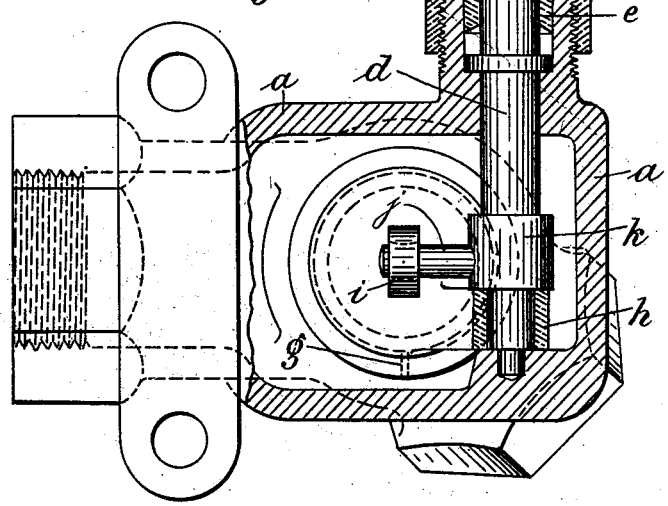

No. 755,284. Patented March 22, 1904.

UNITED STATES PATENT OFFICE.

ROBERT M. DIXON, OF EAST ORANGE, NEW JERSEY, ASSIGNOR TO THE SAFETY CAR HEATING & LIGHTING COMPANY, A CORPORATION OF NEW JERSEY.

END TRAIN-PIPE VALVE.

SPECIFICATION forming part of Letters Patent No. 755,284, dated March 22, 1904.

Application filed October 27, 1902. Serial No. 128,920. (No model.)

*To all whom it may concern:*

Be it known that I, ROBERT M. DIXON, a citizen of the United States, residing at East Orange, in the county of Essex and State of New Jersey, have invented certain new and useful Improvements in End Train-Pipe Valves, of which the following is a specification.

My invention relates to valves primarily adapted for use as end train-pipe valves, and has for its object to produce a valve which may be readily seated and which will operate with a minimum amount of resistance.

In the accompanying drawings I have shown details of one form of valve in which my invention is embodied.

In the drawings, Figure I is a broken-away sectional plan view of the valve structure. Fig. II is a sectional side elevation of the said valve, and Fig. III is a detail underneath view of the valve structure.

In the drawings, $a$ indicates the valve-casing, provided with a seat $b$, shown in the present instance as a concave seat. A bracket or other suitable support $c$ is provided to aid in supporting a valve-spindle $d$, which valve-spindle passes through a gland $e$ on the side of the valve-casing. The valve $f$, which coöperates with the valve-seat, is in the present instance convex and ground to fit the valve-seat and is provided with the notch or drip-orifice $g$. The object of so shaping the valve and its seat is to bring about a self-seating or centering action by the coöperation of the two parts, and to this end other centering means may be used—such, for instance, as by giving a taper to the valve and its seat.

The valve $f$ is provided with a yoke $h$, which fits loosely upon the valve-stem $d$, so as to be capable of moving freely thereon, and the valve is also provided upon its rear face with an apertured lug $i$, which aperture receives an arm $j$, carried upon a collar $k$, turning with the stem $d$.

Any suitable form of handle may be employed, and for the purposes of illustration I have shown a broken-away portion of a handle $l$.

The valve is especially adapted for end train-pipe construction, the stem entering the valve-chamber through a packed joint. There is little or no steam-pressure exerted upon the moving parts to impede their action, so that the valve may be turned with the greatest ease, and as it approaches its seat will be closed down by the steam-pressure, the lost motion between the valve and its stem permitting such independent movement.

The valve has the further advantage that it may be very readily removed, it being merely necessary to take out the plug $m$ and remove the cap $o$, and the valves may then be withdrawn and the operating parts of the valves removed from the side of the valve-casing.

Having described my invention, what I claim, and desire to secure by Letters Patent, is—

In an end train-pipe valve the combination of a valve-casing $a$ having therein a concave-faced seat $b$, a bracket or support $c$ located within the valve-casing, a valve-spindle $d$ passing through the support, a convex-faced valve $f$ combined with a notch or drip-conduit at its edge and means for operating the valve from the exterior of the valve-casing.

R. M. DIXON.

Witnesses:
 FREDERICK E. KESSINGER,
 ELMER E. ALLBEE.